United States Patent [19]

Rinehart

[11] Patent Number: 5,068,995
[45] Date of Patent: Dec. 3, 1991

[54] FLOATING TIP-UP FISHING RIG WITH SWIVEL FISHING BOBBIN

[75] Inventor: John R. Rinehart, Milton, Wis.

[73] Assignee: American Institute of Taxidermy, Inc., Janesville, Wis.

[21] Appl. No.: 599,478

[22] Filed: Oct. 18, 1990

[51] Int. Cl.$^5$ .................. A01K 91/00; A01K 97/12
[52] U.S. Cl. ............................................. 43/17
[58] Field of Search ............... 43/26.1, 17, 43.11, 43/43.12, 43.13

[56] References Cited

U.S. PATENT DOCUMENTS

| | | |
|---|---|---|
| 270,358 | 1/1883 | Aldrich ................................. 43/17 |
| 1,850,296 | 3/1932 | Vermeulen ......................... 43/26.1 |
| 2,707,347 | 5/1955 | Sneed ................................. 43/43.11 |
| 3,099,099 | 7/1963 | Cahen ................................. 43/17 |
| 3,106,796 | 10/1963 | Friedland ......................... 43/26.1 |
| 3,599,370 | 8/1971 | Armata ................................. 43/17 |
| 3,710,500 | 1/1973 | Pena ................................. 43/26.1 |
| 3,973,347 | 8/1976 | Kearney ............................. 43/17 |
| 4,339,888 | 7/1982 | Sheng-Jung ..................... 43/26.1 |
| 4,757,633 | 7/1988 | Van Cleve ......................... 43/26.1 |
| 4,763,437 | 8/1988 | Cuda ................................. 43/17 |

FOREIGN PATENT DOCUMENTS 2204233 8/1973 Fed. Rep. of Germany ....... 43/26.1

*Primary Examiner*—Kurt Rowan
*Attorney, Agent, or Firm*—Howard M. Herriot

[57] ABSTRACT

A floating tip-up fishing rig is provided having a float body, a flagpole, a spring means mounted atop said body at the rear end thereof and connected to the bottom portion of the flagpole urging it to an upright position. An opening vertically through the float body is disposed near the forward end thereof, and has a flared out widened bottom end. A fishline bobbin is swivel-mounted to the bottom of the body centrally thereof within a conically flared out cavity therein. A fishline is coiled about the bobbin. Extending down from near the free end of the flagpole is a cotter pin connected to the flagpole at the eye end of the pin. The cotter pin extends through the opening when the flagpole is in a horizontal or slightly raised position, and the fishline may be pulled from its coiled up portion on the bobbin and set in the closed portion of the cotter pin between its eye end and flared open end. The swivel-mounting of the bobbin within the cavity permits the bobbin to move freely in a curving or circular motion with little resistance as a fish takes out fishline from the bobbin and moves in such curving or circular motion.

11 Claims, 6 Drawing Sheets

FLOATING TIP-UP FISHING RIG WITH SWIVEL FISHING BOBBIN

BACKGROUND OF THE INVENTION

Floating tip-up fishing rigs for fishing in open water are known. One such rig is that shown in the Jan. 9, 1883 U.S. Pat. No. 270,358 of R. W. E. Aldrich. Another is that shown in my U.S. patent application Ser. No. 517,024 filed May 1, 1990. The fishline of such rigs is coiled upon either a float mounted drum spool reel, as in said patent, or a rigid submerged tube, as in said application, and accordingly the spool or tube is incapable of movement to match the movement of a fish that takes the line out and moves about, e.g. in circular movement, as fish often do.

SUMMARY OF THE INVENTION

This invention provides a floating tip-up fishing rig for use in open water, which is easy to use, effective, and inexpensive to manufacture, and which has the fishline coiled about a bobbin which is swivel-mounted to the bottom-center portion of the float body within a flared-out cavity, for matching curving or circular movement about the float by a fish that takes the fishline out.

A boat-shaped float body has a vertical opening therethrough near the front portion thereof, and has a bobbin swivel mounted to the bottom of the float body rearwardly of that opening, the fishline being coiled about the bobbin. A flagpole atop the body is urged upright by a spring. The flagpole may be latched in a horizontal position to be held there while the fisherman baits the fishhook, lets out, from the fishline coiled about the bobbin, the desired amount of fishline, and sets the fishline in a friction grip device such as a cotter pin which is connected to the flagpole, with the cotter pin extending down through the opening. After baiting, letting-out line, and setting the line in the pin, the flagpole is unlatched whereupon it moves, under the urging of the spring, to a slanted position in between the horizontal position and the upright position. When a fish takes the bait, the fishline is pulled from the pin, and the flagpole is moved to the upright position by the spring. As the fish moves in a curving or circular pattern about the float, the bobbin swivels to also move in a matching, curving or circular pattern, so as to lessen the resistance to the fish taking out more line and to increase the chance that the fish will swallow the bait and become more easily hooked.

DETAILED DESCRIPTION

Figure 1:
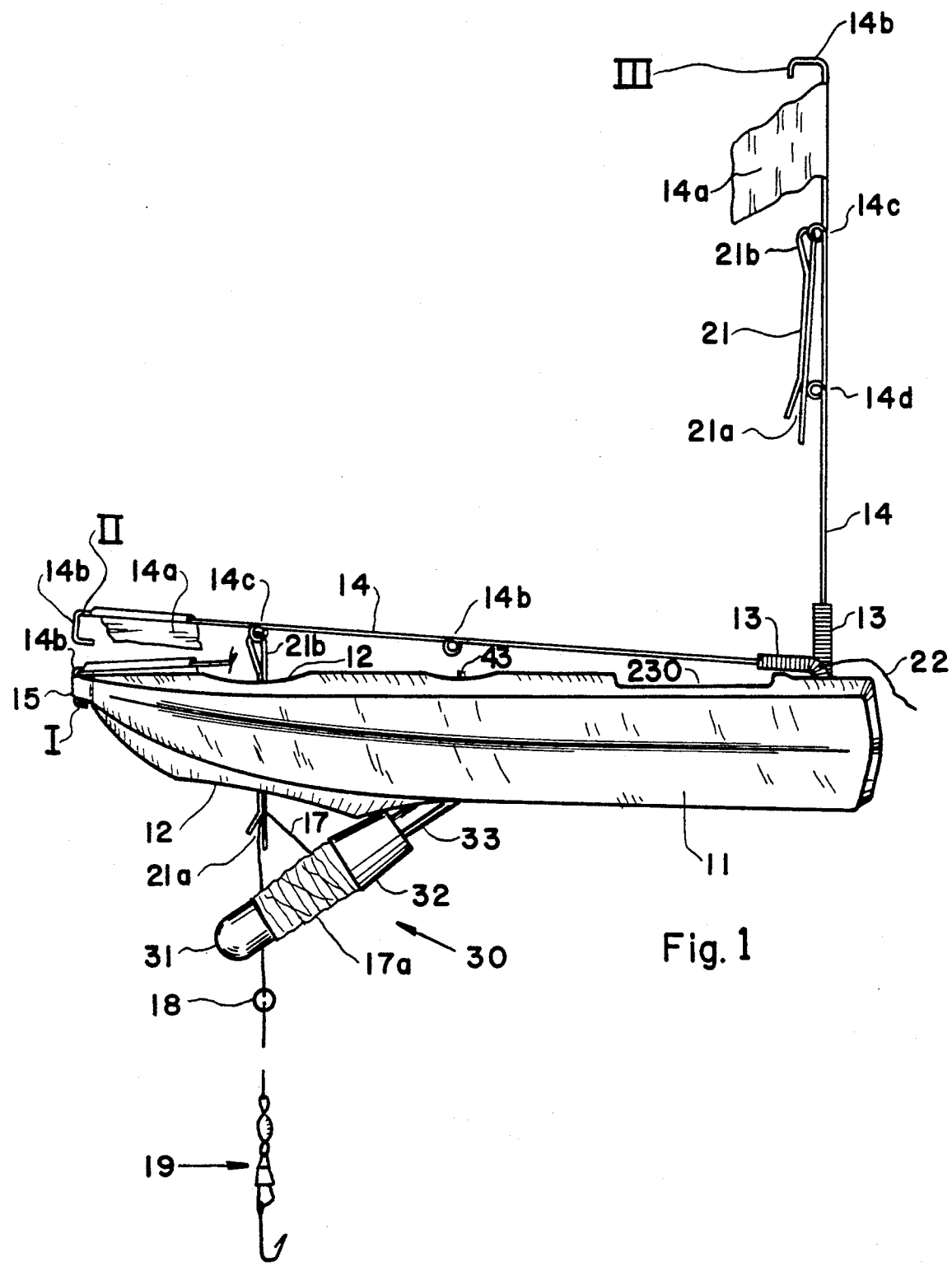
FIG. 1 is a left side elevation of the fishing rig of this invention.

Referring to the drawing, there is shown a floating tip-up rig having a float block or body 11 of boat-shape with a vertical opening or well 12 therethrough near the forward end thereof. A coil spring 13 is mounted on the float body near the rear thereof, and a flagpole 14 is attached to the upper end of the spring 13. The flagpole has thereon near its free end a flag 14a, and has its free end bent into a lift hook 14b. A vertical groove 15 in the front tip of the float body may receive the central portion of hook 14b to hold flagpole 14 in a latched or locked-down horizontal position, indicated as I in FIG. 1.

Figure 11:
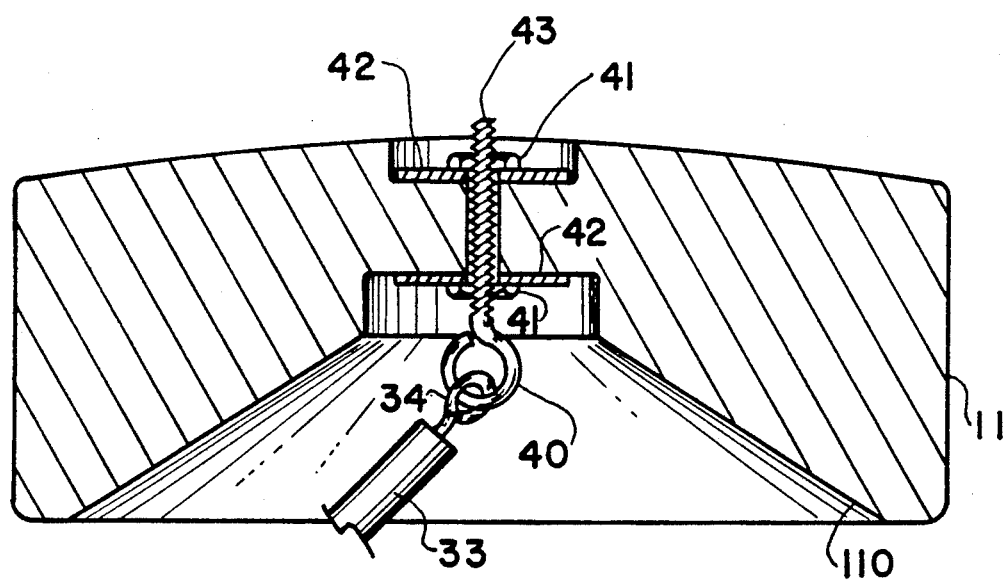
FIG. 11 is a sectional view of the float body on line 11—11 of FIG. 6.

A fishing line 17 has a quantity 17a of line wrapped or coiled about a bobbin 30. Bobbin 30 has a bottom portion 31 about which line 17 is coiled, a cork 32 thereon above portion 31, and an upper shank 33 above the cork. At the top of shank 33 is a screw eye 34 which engages an eye bolt 40 to provide a swivel mount for bobbin 30. See FIGS. 3, 6 and 11. The eye bolt 40 extends through the float body 11, having nuts 41 on its threaded shaft 43, with washers 42, securing the eye bolt to the float body, as is best seen in FIG. 11.

A sinker button 18 is disposed on line 17, and a tackle rig 19, which includes a fishhook 19a and a swivel connector 19b, is connected to the end of the fish line.

A fishline grip cotter pin 21 is connected at its eye and 21b to the upper loop 14c of flagpole 14. The open flared end 21a of the cotter pin is used to grip the fishline 17 when fishing, as hereinafter explained.

A tether line 22, of any desired length, is connected at one of its ends to the coil spring 13.

Flagpole 14 when held in its locked-down position I, shown in FIG. 1, is in the position for baiting the hook, letting out the desired amount of fishline, and then setting the rig for fishing. In this locked-down position I, the flagpole is held by groove 15 and coil spring 13, being placed in this position by pulling the flagpole forward to stretch the spring, placing the hook end 14b of the flagpole in groove 15, and releasing the flagpole allowing spring 13 to retract, thus firmly holding the flagpole in position I, against flying up at the constant urging of spring 13. In this locked-down position, the fisherman baits the fishhook, lets out a desired amount of line, and sets or fixes the line 17 in the cotter pin 21. He so sets the line by sliding it up into and above the open flared end 21a to a place between the closed together pin members in the central part of the cotter pin. To facilitate this task the opening 12 is flared out to be wider at the bottom, to thus allow the fisherman's fingers easy access into the bottom of opening 12 to grasp the lower part of cotter pin 21 with one hand, while he manipulates the fishline 17 with the other hand, pulling the line into the flared open end of cotter pin 21 and up into the closed pin members of the cotter pin. To set the line 17 lightly therein, the line is placed down near the open flared end 21a; to set the line tightly therein, the line is placed therein up near the eye end 21b; and to fix the line at a medium or moderate resistance setting, the line is set in the pin more centrally or medially, e.g. half-way between open flared end 21a and eye end 21b.

Figure 10:
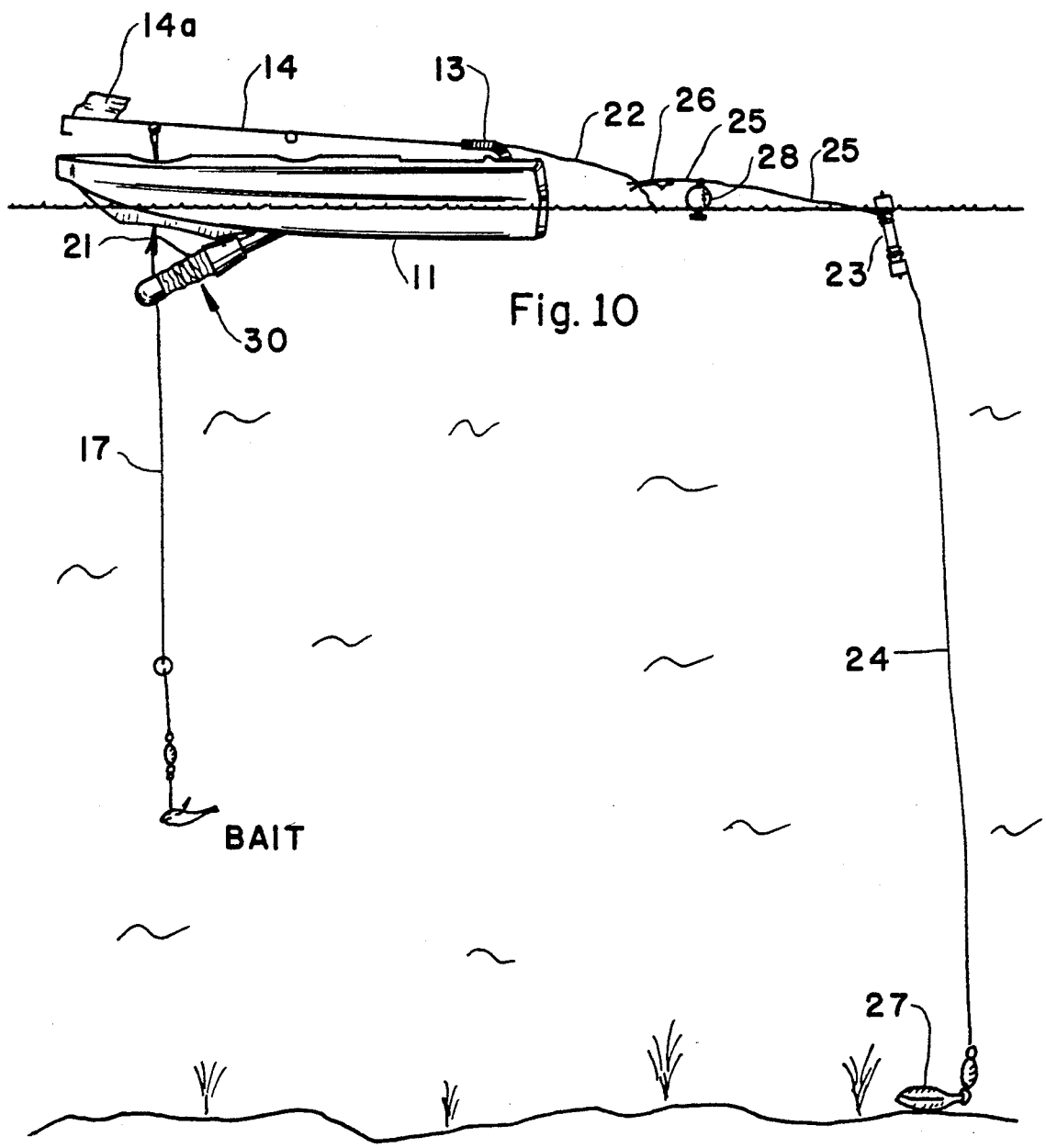
FIG. 10 is a side view schematic showing of the rig, in the water, tethered with the anchor-and-buoy device.

After the fishhook is baited with the desired bait, and after setting the line in the cotter pin to the desired resistance (selected to suit the size and weight of bait used for attracting the type of fish desired), the flagpole is then pulled out of groove 15 and released, whereupon, under the urging of spring 13, the flagpole moves up to and rests at the position II shown in FIGS. 1 and 10. In this fishing position, the fishline extends from its coil or wrap portion 17a up into cotter pin 21 and thence down to the tackle rig 19. In this position, spring 13 urges the flagpole upwardly toward position III, but the flagpole is held in position II, being connected to the bobbin 30 via the cotter pin 21 and fishline 17. Bobbin 30 is tilted forward, resting against the underside of body 11, as shown in FIGS. 1 and 10. The baited fishhook is connected to the cotter pin via the fishline portion between tackle rig 19 and the cotter pin.

A fisherman, on shore or in a boat, may let the body 11 float out away from shore or boat on a long tether line 22; or if desired as shown in FIG. 10, the body 11 may be tethered to an anchored buoy, via a short tether line 22, a tether grip 26, a tether grip line 25, a buoy 23, an anchor line 24 and an anchor 27.

When a large enough fish takes the bait and runs with it, the fishline becomes momentarily taught and is pulled out and away from the cotter pin. When the line is thus pulled out of the cotter pin, the flagpole is released and by the urging of spring 13 is moved up to position III, the "tipped-up" position, which visually alerts the fisherman that a fish has taken the bait. The fish may mouth the bait softly and run for a great distance, and often does so in a circular or curving pattern about the float 11, before swallowing the bait.

Figure 3:
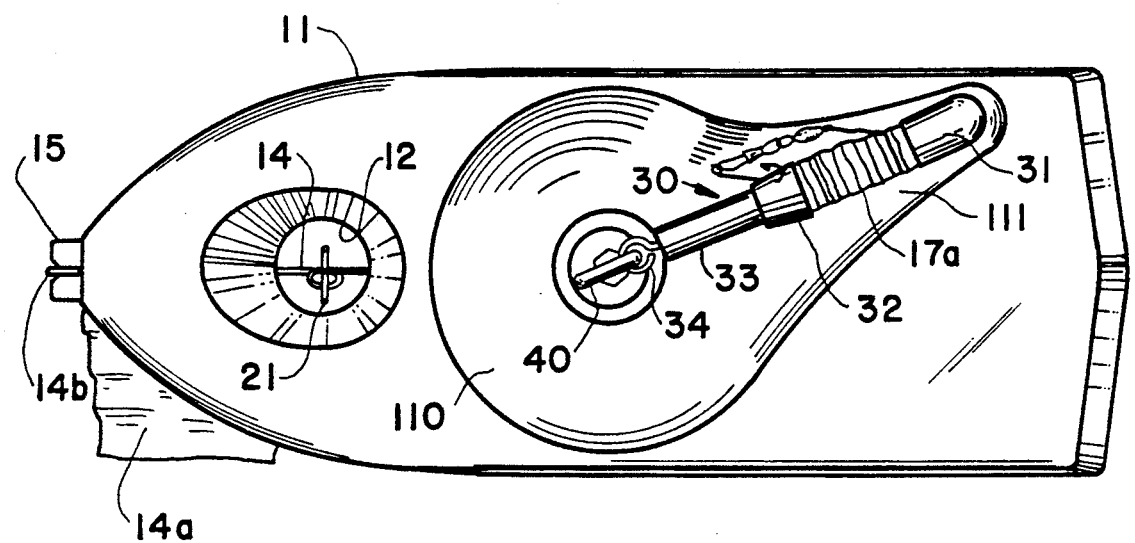
FIG. 3 is a bottom view thereof.
Figure 6:
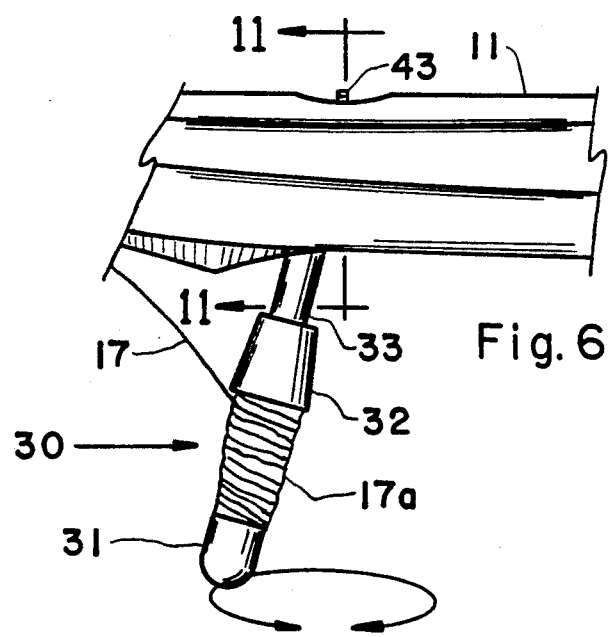
FIG. 6 is a partial view of the float body showing how the bobbin may move in a curving or circular pattern.
Figures 7, 8:
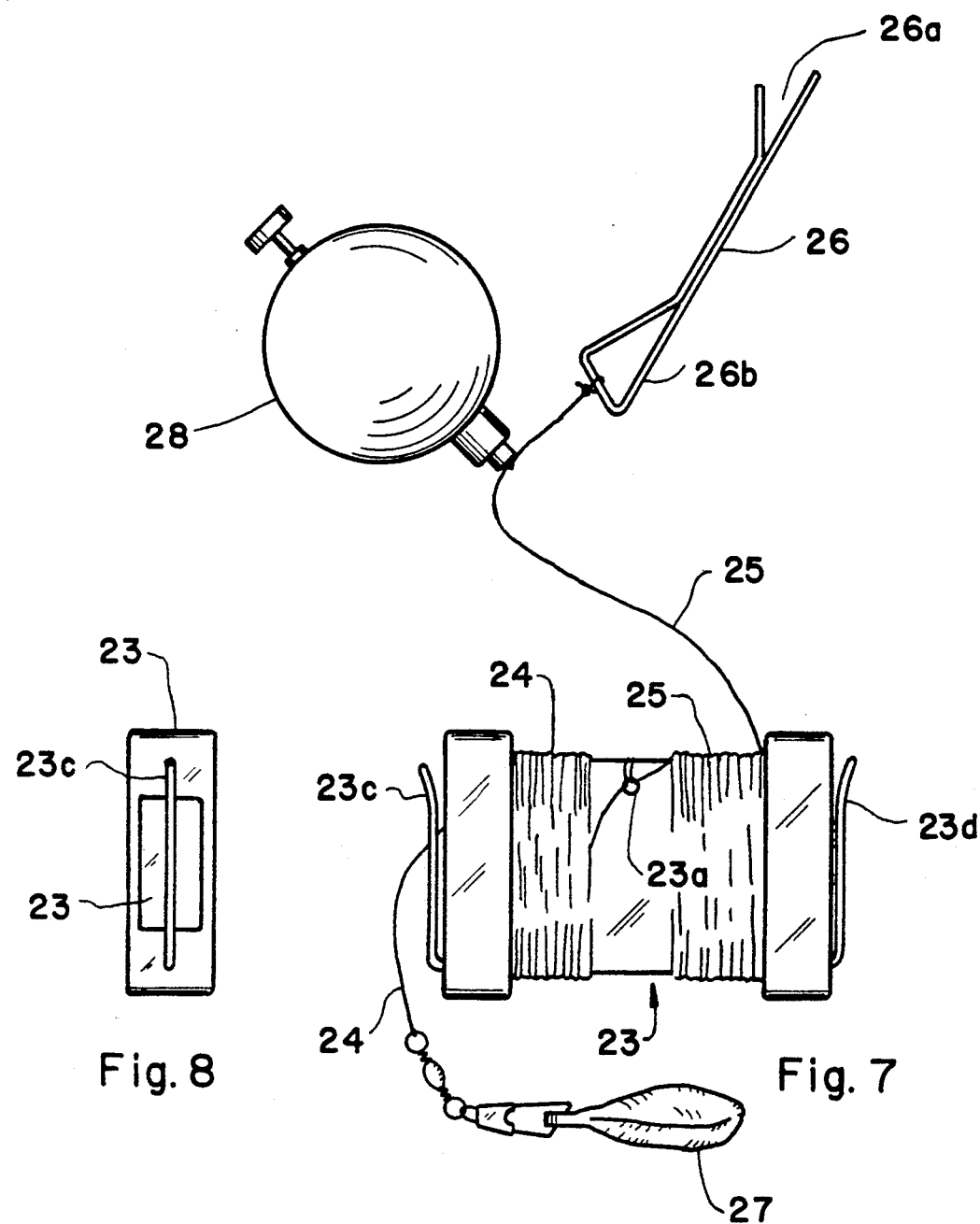
FIG. 7 is a top view of the anchor-and-buoy device for the fishing rig.
FIG. 8 is an end view of the buoy portion thereof.
Figure 9:
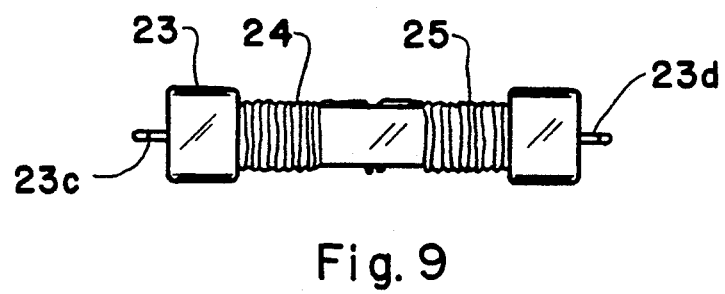
FIG. 9 is a side view thereof.

Because of the conical or flared-out cavity 110 in the bottom of the float, as seen in FIGS. 3 and 11, and the swivel connection of bobbin 30 to the float via eye bolt 40 and screw eye 34, when a fish takes the bait and swims circularly, the bobbin is free to follow that movement quite well, moving as indicated by the arrows in FIG. 6, and because of the flared-out cavity 110, moves freely with little resistance so as not to frighten or "spook" the fish and cause it to spit out the bait.

The fisherman, who may be holding a long tether line from in a boat or on shore, sees that the flagpole is "tipped-up", and he thus knows a fish has struck. He may pull the float 11 close to him (using tether line 22) to gain access to the float 11 and the fishline 17. If the boat or the shore is high enough above the water so that the float may not easily be reached, the fisherman may use a long stick or rod to reach down and out to lift the float from the water to himself with the stick or rod extended into the lift hook 14b at the end of flagpole 14. The fisherman then pulls in any slack in the fishline until he feels the resistance of the fish. He then sets the hook and pulls the line in, together with the hooked fish.

The anchorable tethering means shown in FIGS. 7-10 comprises: a floating spool buoy 23 having connected thereto an anchor line 24 and a tether grip line 25; a tether grip 26; an anchor 27; and a ball float 28. The buoy 23 has a hole 23a therethrough for securing lines 24 and 25 to the buoy. The buoy also has a weight 23b at the anchor and anchor line end of the buoy. This weight causes the buoy to sit vertically in the water when in use, as shown in FIG. 10. A clip 23c at the anchor line end of the buoy holds anchor line 24, and a clip 23d at the tether grip line end of the buoy holds the tether grip line 25.

One end of anchor line 24 is connected to the anchor or sinker 27, the other end being connected to the buoy via hold 23a. An intermediate portion of line 24 is wrapped about a first end of the buoy spool 23. One end of tether grip line 25 is connected to tether line grip 26, the other end of said line being connected to the buoy spool 23 via hole 23a. An intermediate portion of tether grip line 25 is wrapped about a second end of spool 23. Tether grip 26 is a friction grip device such as a cotter pin having a flared open end 26a and a closed eye end 26b, with a friction gripping portion intermediate those ends. A ball float 28 of the fishing bobber type, with a spring biased hook shaft, may be releasably connected to either the eye end 26a or to the line 25 near said eye end.

Figure 2:
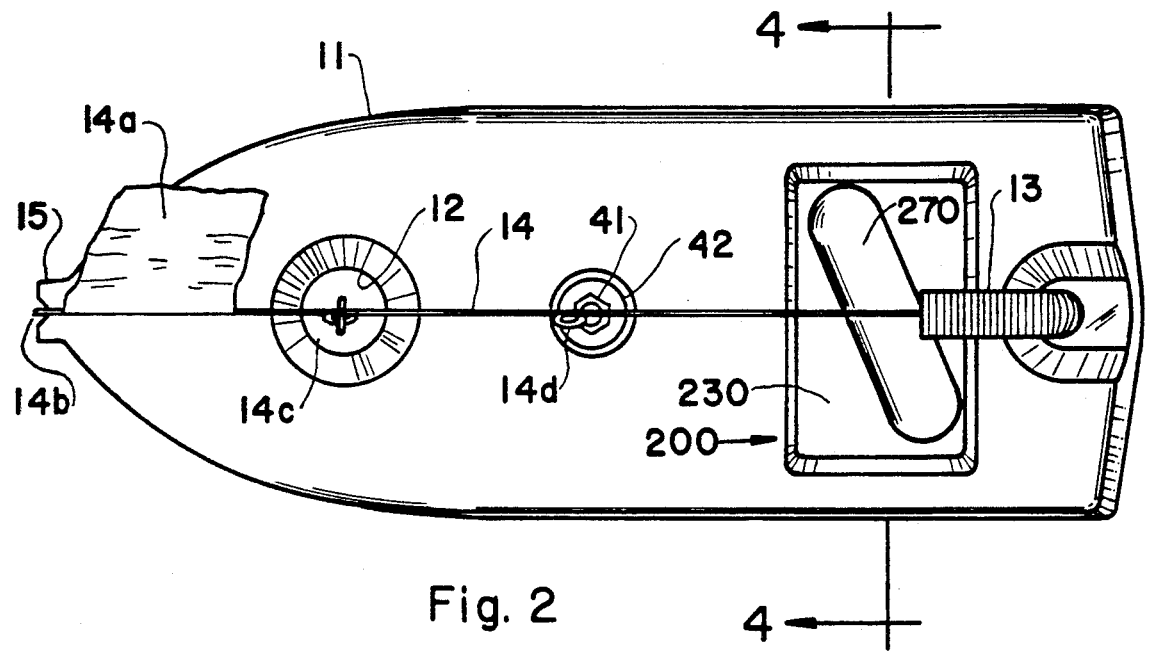
FIG. 2 is a top plan view thereof.
Figure 4:
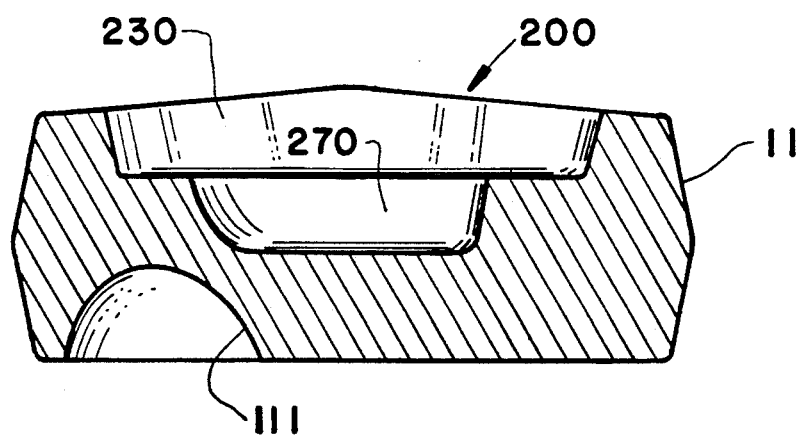
FIG. 4 is a sectional view taken on line 4—4 of FIG. 2.

The anchorable tethering means may be easily and conveniently stored, using storage cavity 200 in float body 11. FIGS. 2 and 4 show cavity 200 which comprises a lower cavity 270 and an upper cavity 230. The lower cavity 270 is shaped and sized to receive the sinker anchor 27 of the anchorable tethering means, and the upper cavity 230 is shaped and sized to receive the floating buoy spool 23 of said means (with its wound lines 24, 25, its cotter pin grip 26, and its clips 23c and 23d.) The ball float or bobber 28 may be left connected so as to ride on the top deck of float body 11, or may be disconnected and stored in the fisherman's tackle box or elsewhere. The clips 23c and 23d hold lines 24 and 25 respectively, to prevent tangling and to enable convenient storage of the anchorable tethering means in cavity 200.

When storing the entire tip up fishing rig, the flagpole is placed in the locked-down position I, after the anchorable tethering means is stored in cavity 200, and the flagpole covers and holds the said means in said cavity. The bobbin 30, with line 17 wrapped about portion 31 thereof and with the fishhook held in cork 32, is conveniently stored in the tail portion 111 of cavity 110, on the underside of float body 11. A close fit between the free end of lower end 31 of bobbin 30 into the smallest end of the cavity 110 tail portion 111 provides a snap fit for convenient and secure storage of the bobbin 30 up close to the underside of float body 11.

Figure 5:
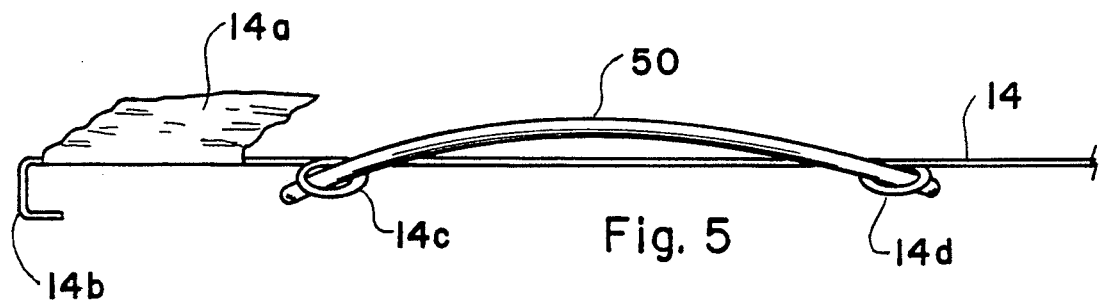
FIG. 5 is a partial view of the flagpole with an indicating member mounted thereon.

As shown in FIG. 5, a transparent or translucent indicator tube 50 containing a light-emitting liquid chemical, may be placed on flagpole 14 by inserting one end in the tube 50 and upper loop 14c of flagpole 14, and the other end of the tube 50 in a lower loop 14d of flagpole 14. The liquid chemical is activated to be light-emitting by bending tube 50, and then tube 50 is placed on flagpole 14 as just stated. This is very helpful for fishing in the darkness of night or on very cloudy days. Also, if desired, a tube of light emitting liquid chemical may be placed in the clip 23d of buoy spool 23, so that while fishing in darkness with the anchored buoy arrangement shown in FIG. 10, the fisherman will by the light emission, know where the buoy is out on the water.

What is claimed is:
1. A floating tip-up fishing rig comprising:
   a float body;
   a flagpole;
   spring means mounted atop said body near the rear end thereof and connected to the bottom portion of said flagpole, urging it to an upright position;
   an opening vertically through said float body near the forward end thereof;

a fishline bobbin swivel-mounted to the bottom of said float body centrally thereof within a cavity therein, and extending below the body;

a fishline coiled about the bottom portion of said bobbin; and a cotter pin having an eye end, on open flared end, and an elongated closed portion between said ends, said eye end connected to said flagpole, and said flared end extending down into said opening;

whereby some of said fishline may be pulled from its coiled portion on the bobbin and easily set in the closed portion of said cotter pin, and whereby said bobbon may move freely in a circular motion within said cavity when a fish takes out fishline and moves in a circular motion.

2. The invention of claim 1 wherein:

the bottom end of said opening is flared outwardly widening the opening for easy finger access thereinto while setting the line in the cotter pin.

3. The invention of claim 1, wherein:

said float body bottom has a conically flared-out cavity centrally thereof; and said bobbin is swivel-mounted to the float body bottom substantially centrally of said cavity.

4. The invention of claim 1, wherein:

said flagpole at its free end is bent to form a lift hook; and said float body has a groove in the forward end thereof into which said lift hook may be placed to hold said flagpole locked down in a horizontal position.

5. The invention of claim 1 wherein:

said flagpole has a first loop formed therein near its free end and a second loop formed therein centrally thereof, said eye end of said cotter pin being connected to said first loop, and said loops providing connection means to receive therebetween an indicator tube.

6. The invention of claim 1 wherein:

the bottom end of said opening is fared outwardly providing a widened recess for easy finger access into the opening;

said float body bottom has a downward and outward flared cavity centrally thereof; and said bobbin is swivel-mounted to said bottom substantially centrally of said cavity.

said flagpole at its free end is bent to form a lift hook;

said float body has a vertical groove in the forward end thereof for receiving said lift hook to hold said flagpole locked down in a horizontal position;

said flagpole has a first loop therein near its free end and a second loop therein near its midpoint for receiving an indicator tube between loops;

said eye end of said cotter pin being connected to said first loop; and said bobbin having a cork on its upper portion for hook-and-line storage by receiving the point of a fishhook connected to the free end of said fishline.

7. A floating tip-up fishing rig comprising:

a float body;

a flagpole;

spring means mounted atop said body near the rear end thereof and connected to the bottom portion of said flagpole, urging it to an upright position;

said float body having an opening extending vertically therethrough near the forward end thereof;

said float body having a conically flared-out cavity in the central portion of its bottom;

said float body having a fishline storage and feed-out bobbin swivel-mounted to the bottom of said body centrally thereof within said cavity and extending below said body;

a fishline having its inner end connected to said bobbin and having its main portion coiled thereabout;

fishing grip means connected to said flagpole and extending therefrom down through said opening for releasably gripping said fishline;

whereby said fishline may be pulled from the main coiled portion of the fishline and be releasably set in said grip means.

8. The invention of claim 7 further having a tether line connected to said float body at the rear end thereof.

9. The invention of claim 8, further having an anchorable tethering means comprising:

a floating buoy spool;

a releasably gripping tether line clip;

a sinking anchor;

an anchor line at one end connected to the central portion of said buoy spool and at its other end connected to said anchor, with an intermediate portion of said anchor line being wrapped about said spool at a first end thereof;

a tether clip line at one end connected to the central portion of said buoy spool and at its other end connected to said clip, with an intermediate portion of said tether clip line being wrapped about said spool at a second end thereof;

whereby said clip may be releasably gripped to the tether line of said float body, to thereby fix the position of said float body on the water tethered to said floating buoy spool, with said spool being anchored to the bottom via said anchor line and said anchor; and a weight embedded in said first end of said spool to tip it down and said second end up, when said spool floats in the water.

10. The invention of claim 9 wherein said float body has in its upper surface a cavity for storing said anchorable tethering means when it is not in use.

11. The invention of claim 10 wherein said cavity has a lower portion shaped and sized to receive said anchor and an upper portion shaped and sized to receive said spool.

* * * * *